United States Patent [19]
Mercer

[11] Patent Number: 4,920,005
[45] Date of Patent: Apr. 24, 1990

[54] AROMATIC POLYMER COMPOSITIONS

[75] Inventor: Frank Mercer, Belmont, Calif.

[73] Assignee: Raychem Corporation, Menlo Park, Calif.

[21] Appl. No.: 355,937

[22] Filed: May 23, 1989

Related U.S. Application Data

[60] Division of Ser. No. 7,295, Jan. 27, 1987, Pat. No. 4,835,197, which is a continuation-in-part of Ser. No. 815,523, Dec. 31, 1985, abandoned, which is a continuation-in-part of Ser. No. 688,794, Jan. 24, 1985, abandoned.

[51] Int. Cl.$^5$ .................. B32B 27/34; B32B 27/36; B32B 27/06
[52] U.S. Cl. .................. 428/411.1; 428/419; 428/412; 428/500; 428/473.5; 428/524
[58] Field of Search ............. 428/419, 524, 412, 500, 428/473.5, 411.1

[56] References Cited

U.S. PATENT DOCUMENTS

| | | | |
|---|---|---|---|
| 3,897,395 | 7/1975 | D'Alelio | 528/170 |
| 3,988,986 | 12/1976 | D'Alelio | 528/170 |
| 4,080,484 | 3/1978 | Mathias | 525/426 |
| 4,168,360 | 9/1979 | D'Alelio | 525/426 |
| 4,168,366 | 9/1979 | D'Alelio | 525/426 |
| 4,168,367 | 9/1979 | D'Alelio | 525/426 |
| 4,250,279 | 2/1981 | Robeson et al. | 525/905 |
| 4,251,417 | 2/1981 | Chow et al. | 525/426 |
| 4,251,418 | 2/1981 | Chow et al. | 525/426 |
| 4,251,419 | 2/1981 | Hellman et al. | 525/426 |
| 4,276,352 | 6/1981 | Green | 525/925 |
| 4,293,670 | 10/1981 | Robeson et al. | 525/435 |
| 4,316,845 | 2/1983 | D'Alelio et al. | 525/460 |
| 4,351,932 | 9/1982 | Street et al. | 526/262 |
| 4,365,034 | 12/1982 | Grimes et al. | 524/256 |
| 4,396,658 | 8/1983 | Mettes et al. | 525/537 |
| 4,405,521 | 9/1983 | D'Alelio et al. | 525/279 |
| 4,418,181 | 11/1983 | Monacleli | 525/426 |
| 4,622,368 | 11/1986 | Verbicky et al. | 525/426 |

FOREIGN PATENT DOCUMENTS 0133357 11/1985 European Pat. Off.

OTHER PUBLICATIONS

Husman et al., "Acetylene Terminated Sulfone Resin Development," National SAMPE Technical Conference, vol. 12, pp. 494–504, 1980.
Chu et al., Org. Coat. Plast. Chem. 43, 702–708 (1980).
Havens et al., Polym. Prepr., vol. 24, No. 2, pp. 16–17 (1983).
Hergenrother et al., SAMPE J. 205(5), pp. 18–23 (1984).
Havens et al., J. Polym. Sci. Polym. Chem. Ed. 22, 3011–3025 (1984).

*Primary Examiner*—Marion C. McCamish
*Assistant Examiner*—Elizabeth M. Cole
*Attorney, Agent, or Firm*—Yuan Chao; Edith A. Rice; Herbert G. Burkard

[57] ABSTRACT

This invention relates to novel curable compositions comprising (a) a first component comprising an aromatic polymer having a first preponderant repeat unit and (b) a second component comprising an acetylene, maleimide, or vinyl terminated poly(imide) or poly(isoimide) or precursor thereof, which second component is compatible with the first component, has 1 to 300 second preponderant repeat units which are different from the first preponderant repeat units of the first component, is substantially free of elemental sulfur and reactive divalent sulfur, and is present in an amount effective to substantially cure the composition. The compositions are useful as adhesives, coatings and matrix resins for fiber reinforced composites. They exhibit improved adhesion to various substrates, increased tensile strength and improved resistance to cracking. The invention also relates to the composition which contains a reinforcing filler. The invention also relates to the composition after it has been cured. The invention further relates to a multi-layered article for use in electronic devices, the article comprising a plurality of layers each comprising a cured composition of the invention with one or more intervening layers of conductive or semiconductive material.

26 Claims, No Drawings

4,920,005

AROMATIC POLYMER COMPOSITIONS

This application is a division of copending application Ser. No. 07/007,295 filed Jan. 27, 1987, now U.S. Pat. No. 4,835,197 which is continuation-in-part of U.S. patent application Ser. No. 815,323, filed Dec. 31, 1985, now abandoned which is a continuation-in-part of U.S. patent application Ser. No. 688,794, filed Jan. 4, 1985, now abandoned the disclosures of which are incorporated herein by reference.

BACKGROUND OF THE INVENTION

1. Field of the Invention

This invention relates to a novel curable polymeric composition, the composition after it has been cured and an article comprising at least one layer of the composition supported on a substrate.

2. Background and Invention

Aromatic polymers have many desirable properties, such as good lap shear strength, thermal stability and tensile strength which make them useful for a wide variety of applications. The term aromatic polymer is used herein to mean a polymer which has aromatic groups incorporated in the repeat unit of their backbone chain. Such polymers include for example poly(imides), poly(etherimides), poly(sulfones), poly(ether sulfones), poly(aryl ether ketones), poly(carbonates), poly(arylates) and the like.

Aromatic polymers can be used as adhesives, coatings, matrix resins for fiber reinforced composite structures and numerous other uses where a relatively thin layer of the polymer is placed on a substrate. One of the problems that has been encountered in the use of aromatic polymers is the tendency of the polymers to crack, particularly when exposed to certain solvents. Further, when used as adhesives and coatings the adhesion between the polymer and various substrates can be less than that required for high performance applications.

I have now discovered that solvent cracking resistance, adhesive properties, high temperature properties and tensile strength of aromatic polymers can be significantly improved by adding a reactive aromatic component to the aromatic polymer and then curing the resulting composition.

SUMMARY OF THE INVENTION

This invention provides a curable composition comprising:

(a) a first component comprising an aromatic polymer having a first preponderant repeat unit and (b) a second component comprising an acetylene, maleimide, or vinyl terminated poly(imide) or poly(isoimide) or precursor thereof, which second component is compatible with the first component, has 1 to 300 second preponderant repeat units which are different from the first preponderant repeat units of the first component, is substantially free of elemental sulfur and reactive divalent sulfur, and is present in an amount effective to substantially cure the composition.

Such compositions when cured are surprisingly improved as adhesives, are capable of forming free standing films, are melt fusible, exhibit improved creep resistance, are not brittle, exhibit increased tensile strength, show improved resistance to cracking. Even further, it has been discovered that the compositions are useful as the matrix resin for reinforced composites. The composition is also useful in making an article comprising a substrate having on a surface thereof at least one layer of a cured, aromatic polymer-based composition of this invention. Of particular interest are articles containing a plurality of layers, each comprising a cured composition of this invention, with a conductive layer interposed between two adjacent layers. Such articles can be used as packaging-interconnect devices for integrated circuits.

In another embodiment, the invention relates to a method of bonding comprising (1) heating a composition to predetermined temperature; (2) positioning the composition between two substrates; (3) applying pressure; and (4) curing the bonded substrates for a predetermined time and temperature.

In a still further embodiment, the invention relates to a method of preparing an article (a) depositing on a surface of said substrate a first layer of a composition comprising a solution of a composition in a solvent therefor; (b) evaporating said solvent; and (c) curing said composition.

DETAILED DESCRIPTION OF THE INVENTION

In the curable composition of this invention, it is preferred that the first component comprise from about 99% to about 1% by weight of the composition and the second component comprise from about 1% to about 99% by weight to the composition. It is further preferred that the first component comprise at least 20%, more preferably at least 40% and most preferably at least 50% by weight of the composition. It is further preferred that the second component comprise from about 5% to about 35% by weight of the composition. It is further surprisingly found that some of the compositions of the invention are molecularly compatible forming molecularly compatible blends.

By preponderant repeat unit we mean that repeat unit which forms the largest fraction by weight of the repeat units present in either the first or second component.

The second component of the curable composition of this invention can be an acetylene, maleimide, or vinyl terminated poly(imide) or poly(isoimide) or precursor thereof. By precursor, it is meant a polymer having a functionality which can be converted into a poly(imide) or a poly(isoimide), for example a poly(amic acid) or a monomer or mixture of monomers which can be polymerized to yield a poly(imide) or a poly(isoimide). It is selected such that it is compatible with the first component. It has from 1 to 300 repeat units in its backbone, preferably 1 to 30 and more preferably 1 to 10 repeat units. The second component is selected such that its repeat unit is different from that of the first component. For example, where an acetylene terminated poly(imide) having a specific preponderant repeat unit is selected as the second component, the first component will not be a poly(imide) having the same preponderant specific repeat unit. Further, the second component is substantially free of elemental sulfur and divalent reactive sulfur. The term "substantially free" is used herein to mean that relatively minor amounts of sulfur may be present, but in amounts which are insufficient to effect substantial cure of the composition without addition of a second component in accordance with this invention.

The first component of the composition comprises an aromatic polymer having a first preponderant repeat unit. It will be understood that references to aromatic polymers mean polymers which have aromatic groups incorporated in the repeat unit of their backbone chain, not merely appended as side groups, as for example in polystyrene. Preferably the aromatic polymers do not have two or more adjacent methylene groups in the repeat unit. More preferably any methylene groups in the monomer unit are linked to quarternary carbon atoms (i.e. aliphatic carbon atoms not linked to hydrogen). Most preferably, any aliphatic carbon atom in the monomer unit linked to one or two hydrogen atoms is also linked to at least two quarternary carbon atoms. Preferred aromatic polymers include:

(a) poly(sulfones);
(b) poly(aryl ether ketones);
(c) poly(carbonates);
(d) poly(arylates);
(e) poly(imides);
(f) poly(benzimidazopyrolones); and
(g) polyimide isoindoloquinazolinedione.

Poly(sulfones) suitable for use in the invention are well known and are linear thermoplastic poly(arylene) poly(ethers) wherein the arylene units are interspersed with a sulfone linkage. These polymers may be obtained by reaction of an alkali metal double salt of a dihydric phenol and a dihalobenzenoid or dinitrobenzenoid compound either or both which contain a sulfone linkage, i.e. —SO$_2$—, between arylene groupings, to provide sulfone units in the polymer chain. Polymers of this sort are further described in U.S. Pat. No. 4,293,670, incorporated herein by reference. Preferred poly(sulfones) are of the formula:

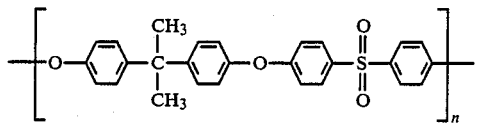

where n is greater than 1 but preferably from about 10 to about 10,000 or more and the poly(ether sulfone) having the formula:

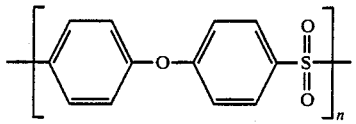

where n is great than 1 but preferably from about 10 to about 10,000 or more.

Poly(aryl ether ketones) suitable for use in this invention have the repeat units of the formula

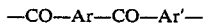

wherein Ar and Ar' are aromatic moieties at least one of which contains a diaryl ether linkage forming part of the polymer backbone and wherein both Ar and Ar' are covalently linked to the carbonyl groups through aromatic carbon atoms.

Preferably, Ar and Ar' are independently selected from substituted and unsubstituted phenylene and substituted and unsubstituted polynuclear aromatic moieties. The term polynuclear aromatic moieties is used to mean aromatic moieties containing at least two aromatic rings. The rings can be fused, joined by a direct bond or by a linking group. Such linking groups include for example, carbonyl, ether sulfone, sulfide, amide, imide, azo, alkylene, perfluoroalkylene and the like. As mentioned above, at least one of Ar and Ar' contains a diaryl ether linkage.

The phenylene and polynuclear aromatic moieties can contain substituents on the aromatic rings. These substituents should not inhibit or otherwise interfere with the polymerization reaction to any significant extent. Such substituents include, for example, phenyl, halogen, nitro, cyano, alkyl, 2-alkynyl and the like.

Poly(aryl ether ketones) having the following repeat units are preferred:

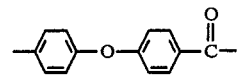

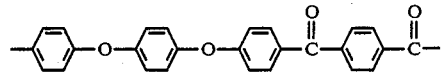

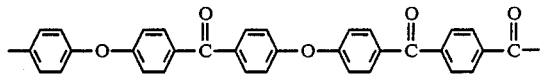

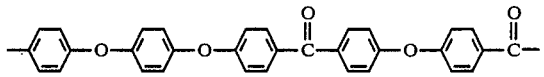

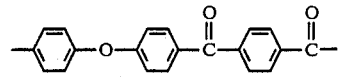

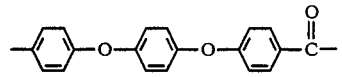

Poly(aryl ether ketones) can be prepared by known methods of synthesis. Preferred poly(aryl ether ketones) can be prepared by Friedel-Crafts polymerization of a monomer system comprising:

(I)
(i) phosgene or an aromatic diacid dihalide together with
(ii) a polynuclear aromatic comonomer comprising:
(a) H—Ar—O—Ar—H
(b) H—(Ar—O)$_n$—Ar—H wherein n is 2 or 3
(c) H—Ar—O—Ar—(CO—Ar—O—Ar)$_m$—H wherein m is 1, 2 or 3 or (II) an acid halide of the formula:

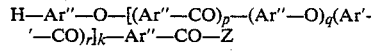

wherein Z is halogen, k is 0, 1 or 2, p is 1 or 2, q is 0, 1 or 2 and r is 0, 1 or 2; or (III) an acid halide of the formula:

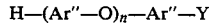

wherein n is 2 or 3 and Y is CO—Z or CO—Ar'—CO—Z where Z is halogen;
wherein each Ar" is independently selected from substituted or unsubstituted phenylene, and substituted and unsubstituted polynuclear aromatic moieties free of ketone carbonyl or ether oxygen groups, in the presence of a reaction medium comprising:

(A) a Lewis acid in an amount of one equivalent per equivalent of carbonyl groups present, plus one equivalent per equivalent of Lewis base, plus an amount effective to act as a catalyst for the polymerization;

(B) a Lewis base in an amount from 0 to about 4 equivalents per equivalent of acid halide groups present in the monomer system;

(C) a non-protic diluent in an amount from 0 to about 93% by weight, based on the weight of the total reaction mixture.

The aromatic diacid dihalide employed is preferably a dichloride or dibromide. Illustrative diacid dihalides which can be used include, for example

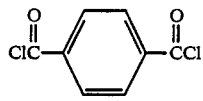

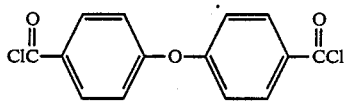

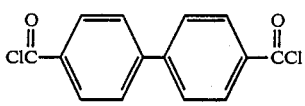

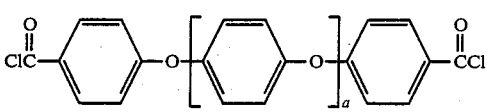

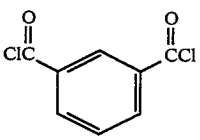

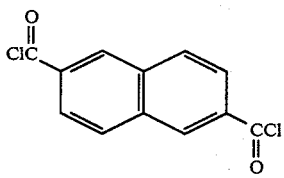

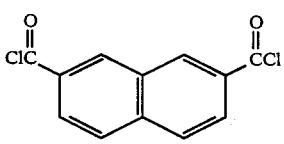

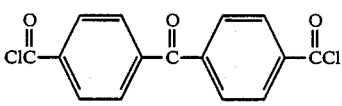

wherein a is 0–4.

Illustrated polynuclear aromatic comonomers which can be used with such diacid halides are:

(a) H—Ar''—O—Ar''—H, which includes, for example:

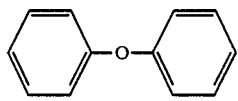

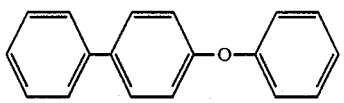

(b) H—(Ar''—O)$_n$—Ar''—H, which include, for example:

and

(c) H—Ar''—O—Ar''—(CO—Ar''—O—Ar'')$_m$—H, which includes, for example:

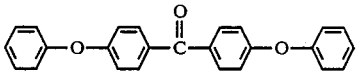

and (d) H—(Ar''—O)$_n$—Ar''—CO—Ar''—(O—Ar'')$_m$—H which includes, for example:

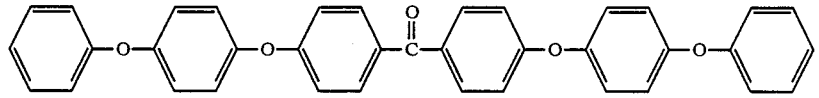

Monomer systems II and III comprise an acid halide. (The term acid halide is used herein to refer to a monoacid monohalide.) In monomer system II, the acid halide is of the formula:

H—Ar''—O—[(Ar''—CO)$_p$—(Ar''—O)$_q$—(Ar'—'—CO)$_r$]$_k$—Ar''—CO—Z

Such monomers include for example, where k=0

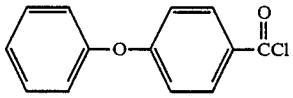

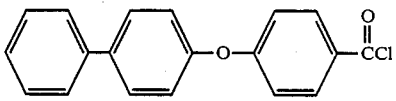

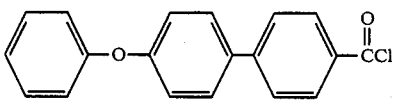

-continued

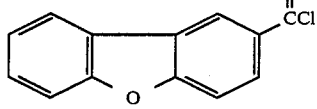

and wherein k=1

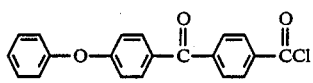

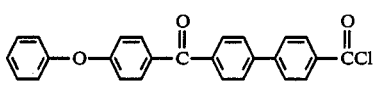

In monomer system III, the acid halide is of the formula

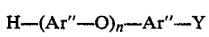

Examples of such acid halides include

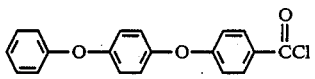

and

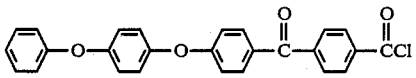

It is to be understood that combinations of monomers can be employed. For example, one or more diacid dihalides can be used with one or more polynuclear aromatic comonomers as long as the correct stoichiometry is maintained. Further, one or more acid halides can be included. In addition monomers which contain other linkages such as those specified above, can be employed as long a one or more of the comonomers used contains at least one ether oxygen linkage. Such comonomers include for example:

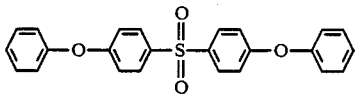

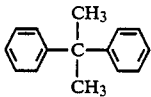

which can be used as the sole comonomer with an ether containing diacid dihalide or with phosgene or any diacid dihalide when used in addition to a polynuclear aromatic comonomer as defined in I(ii)(a), I(ii)(b), I(ii)(c) or I(ii)(d). Similarly

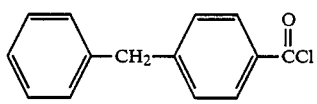

can be used as a comonomer together with an ether-containing polynuclear aromatic acid halide or as an additional comonomer together with a monomer system as defined in I.

The monomer system can also contain up to about 30 mole % of a comonomer such as a sulfonyl chloride which polymerizes under Friedel-Crafts conditions to provide ketone/sulfone copolymers.

Further details of this process for producing poly(aryl ether ketones) can be found in published PCT Application No. WO 84/03891, the disclosure of which is incorporated herein by reference.

Other processes for preparing these polymers can be found in U.S. Pat. Nos. 3,953,400, 3,956,240, 3,928,295, 4,176,222 and 4,320,220.

The poly(carbonates) suitable for use in the invention are well known and are thermoplastic linear polyesters of carbonic acid, made by the polymeric condensation of bisphenols with a phosgene or its derivatives. These polymers are known for their excellent properties of toughness, flexibility, impact strength, optical clarity and heat resistance. More recent representative examples are included in U.S. Pat. Nos. 4,469,861, 4,469,833, 4,469,860, 4,469,852, 4,469,850 and 4,469,838. Preferred poly(carbonates) include any of the Lexan grades available from General Electric which have the general formula:

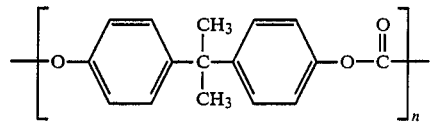

wherein n is greater than 1 but preferably from about 10 to about 10,000 or more.

Poly(arylates) suitable for use in the invention are aromatic polyesters derived from a dihydric phenol, particularly bisphenol A and an aromatic dicarboxylic acid, particularly mixtures of terephthalic and isophthalic acids. See for example and further definition U.S. Pat. Nos. 4,246,381 and 4,250,279 incorporated herein by reference. A preferred poly(arylate) is of the formula:

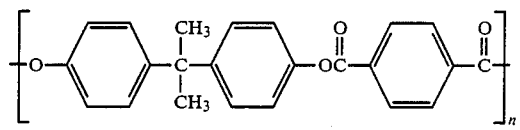

wherein n is greater than 1 but preferably from about 10 to about 10,000 or more, commercially available from Union Carbide under the trade name of Ardell in a number of grades where average molecular weight varies.

Aromatic poly(imides) can be prepared by any suitable means for example see Journal of Polymer Science, Part A, Vol. 1, pages 3135–3150 (1963) incorporated herein by reference. Especially preferred are the following aromatic poly(imides):

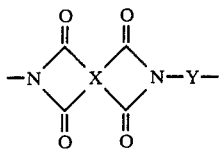

wherein X is:

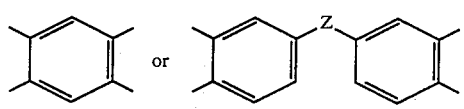

wherein Y is

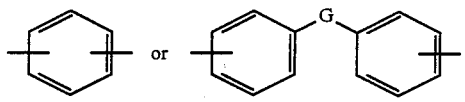

wherein G and Z are independently
  (a) a single bond
  (b) O
  (c) S
  (d) CH₂
  (e) O—Ar—O, wherein Ar is

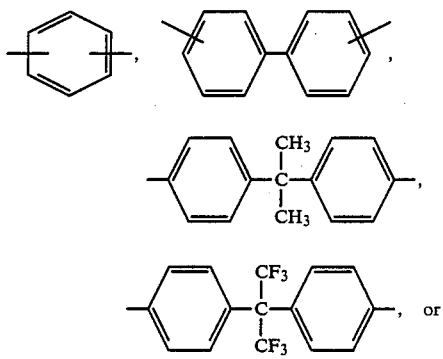

(f) —(C(CF₃)(C₆H₅)—

(g) CO
(h) SO₂
(i) C(CF₃)₂

(j) CF₂
(k)

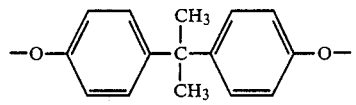

(l) 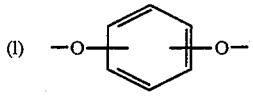

(m) C(R₁)₂ wherein R₁ is H or alkyl of 1 to 6 carbon atoms each R₁ being the same or different
(n) —CH(OH)—

(o) 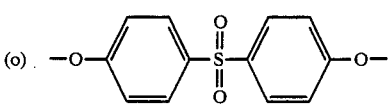

or (p) 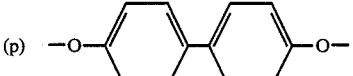

Other preferred aromatic poly(imides) include poly(imides) having phenylindane diamine and/or dianhydride moieties incorporated into the poly(imide) backbone are described in U.S. Pat. No. 3,856,752, incorporated herein by reference. A preferred such poly(imide) is XU218 from Ciba-Geigy which is of the formula:

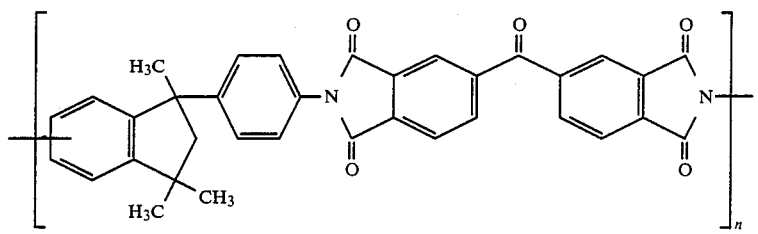

wherein n is greater than 1.

Among the preferred poly(imides) are the melt-processable aromatic polyimides having ether linkages between aromatic groups, also commonly known as poly(ether-imides). Their preparation is well known in the art and is described in, for example, U.S. Pat. Nos. 3,847,867; 3,838,097 and 4,107,147. A preferred poly(etherimide) has the structure

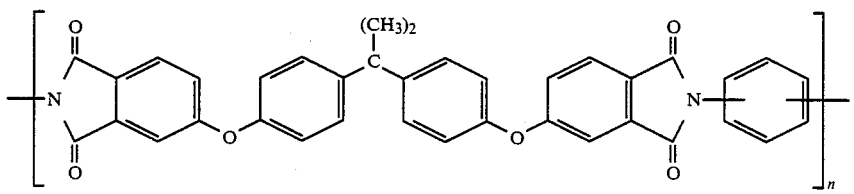

where n is greater than 1 but preferably is between about 10 to about 10,000. It is available as Ultem D-1000 from General Electric as a high molecular weight,

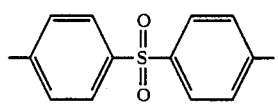

amorphous melt processable polymer. See also Makromol. Chem., Rapid Commun. 1, 667 (1980).

Poly(benzimidazopyrrolones) or pyrrones are well known in the art and can be prepared for example by methods taught in J. Macromol, Sci.-Revs. Macromol. Chem, C11(1), 143–176 (1974) incorporated herein by reference. Preferred pyrrones have the structure

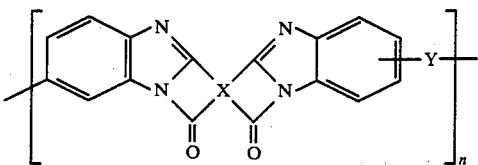

wherein X and Y are the same as the aromatic poly(imides) described above and n is an integer greater than 1.

Polyimide isoindoloquinazolinedione compounds (PIQ) are well known in the art. For example, see Polymer Materials for Electronic Applications, Fell and Wilkins, 1982, pages 123–138 incorporated herein by reference. Particularly preferred are PIQ compounds of the formula

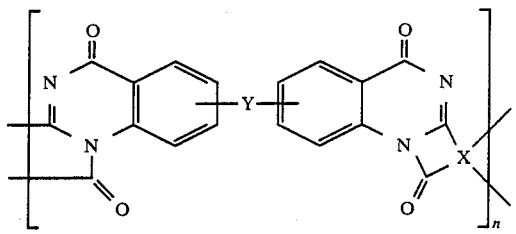

wherein X and Y are the same as the aromatic poly(imides) above and n is greater than 1.

The second component is present in an amount such that on reacting it will substantially cure the composition. The term "substantially cure" is used herein to mean the composition on curing will have a gel percent as measured by the percent insolubles in chloroform of at least about 10%, preferably at least about 30% and more preferably at least about 50%. The exact mechanism by which curing of the composition takes place is not fully understood. It is believed that one or more of the following reactions takes place. The second component may crosslink with itself entrapping portions of the aromatic first component. The second component may crosslink with two or more sites on the first component forming a "bridge" crosslink. This bridge crosslink may be between sites on the same molecule or between sites on different molecules of the first component.

Acetylene terminated aromatic poly(imides), poly(isoimides), and polymeric precursors thereof and their preparation are described in Landis et al, Polym. Prepr., Am. Chem. Soc., Div. Polym. Chem., Vol. 15, No. 2, Jan 9, 1974, pp 537–41; U.S. Pat. Nos. 3,845,018 (1974), 3,864,309 (1975) and 3,879,349 (1975) all to Bilow et al; and U.S. Pat. No. 4,307,220 to Lucarelii et al (1981), incorporated herein by reference. These addition curable compounds crosslink and cure without offgassing to produce low void moldings and structural composites of high strength which are stable up to 370° C.

Preferred poly(imides) and poly(isoimides) are the terminal acetylenic-capped aromatic poly(imide) and poly(isoimide) oligomers from National Starch (Thermid) having repeat units as follows:

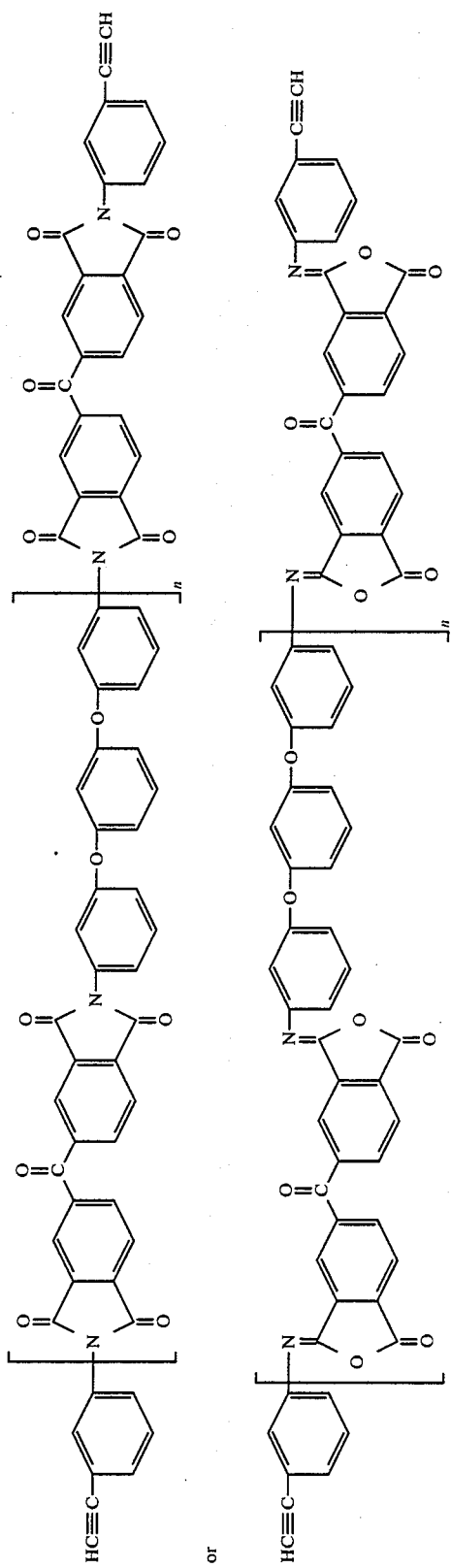

wherein n is from 1 to about 300 but preferably from 1 to about 30 and more preferably from 1 to about 10.

The poly(imides) and poly(isoimides) used in the curable composition of the invention may be formed in situ by forming the composition with a precursor of said poly(imide) or poly(isoimide). Said precursors may be converted to said poly(imide) or poly(isoimides) during cure or use of the composition as an adhesive or the like. Precursors of the poly(imides) and poly(isoimides) are known and described in, for example, the references cited above. Such precursors can be polymeric, for example a poly(amic acid) of the structure

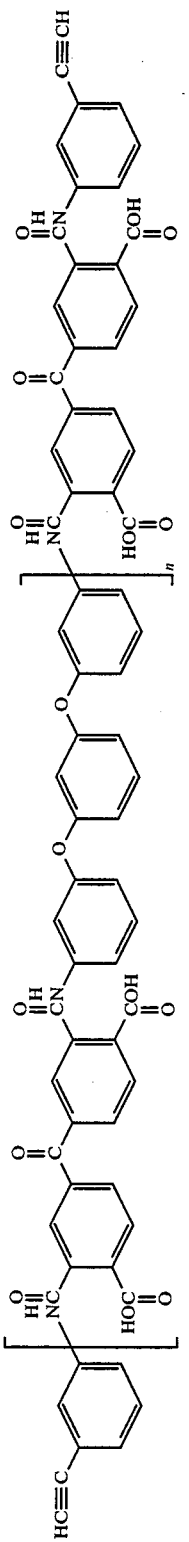

wherein n is from 1 to about 300 but preferably from 1 to about 30 and more preferably from 1 to about 10. Alternatively, the precursor can be a mixture of the suitable monomers, for example,

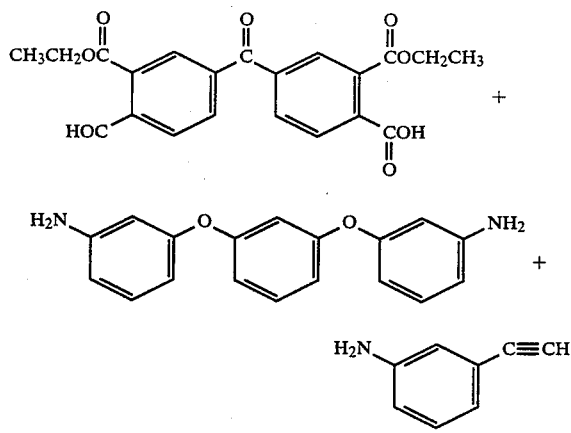

in the respective molar ratio of n:(n−1):2.

Maleimide and vinyl terminated poly(imides) may be made similarly to the acetylene terminated poly(imides) above or, for example, see Examples 9 to 11. See U.S. Pat. Nos. 3,576,691 (1971) to Meyers; 3,380,964 (1964) to Grundshober et al; and 4,251,419 (1981) to Heilman et al.

Other preferred acetylene, maleimide and vinyl terminated poly(imides) include

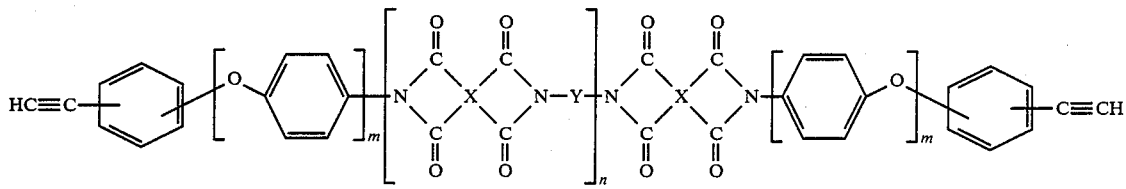

wherein n is 1 to 300 and m is 0 to 4,

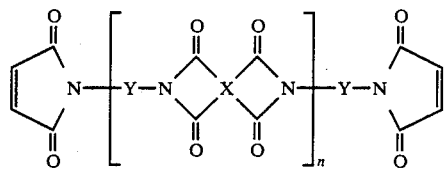

wherein n is 1 to 300,

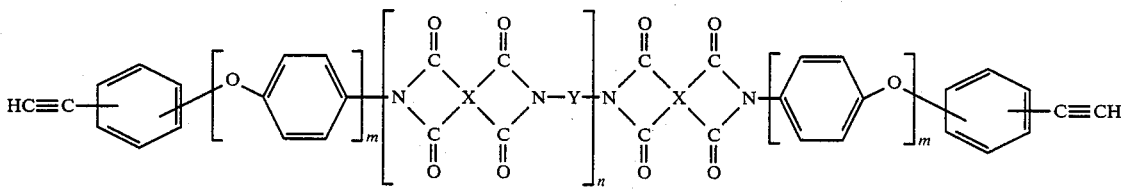

wherein n is 1 to 300 and m is 0 to 4 and wherein X and Y are as hereinbefore defined.

It is understood that one first or second component can be present in the composition to provide the desired physical properties of the final article. The components can be used in any of the various commercial grades which may vary in average molecular weights, molecular weight distributions and may contain minor amounts of comonomer residues and the like.

A preferred embodiment having more than one first component is the composition comprising
  (1) a poly(etherimide);
  (2) a poly(aryl ether ketone); and
  (3) an acetylene terminated aromatic poly(imide), poly(isoimide), or a polymeric precursor thereof.

In yet another preferred embodiment of the invention, the first component is a poly(imide) having isopropylidene (—C(CH$_3$)$_2$) or hexafluoroisopropylidene (—C(CF$_3$)$_2$—) groups in its backbone. Such poly(imides) are valued for their high-temperature stability. They also exhibit lower dielectric constants and moisture absorption characteristics than corresponding poly(imides) without isopropylidene or hexafluoroisopropylidene groups, properties which make them particularly desirable for certain electronics applications. However, they are often susceptible to solvent-induced stress cracking or crazing when exposed to polar aprotic solvents such as N-methyl-2-pyrrolidinone, especially at elevated temperatures such as 75° C. It has been surprisingly discovered that after curing, compositions according to this invention having such first components exhibit substantially increased the solvent resistance, particularly the solvent stress crack resistance, compared to the solvent resistance of the poly(imide) itself. Examples of isopropylidene or hexafluoroisopropylidene containing poly(imides) which can be used as first components include those having the repeat unit

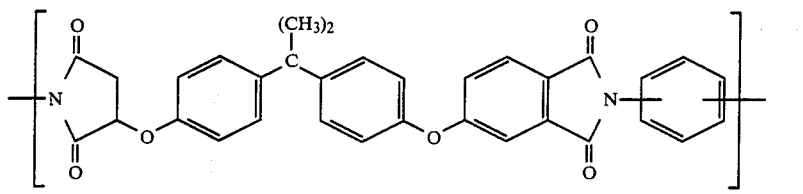
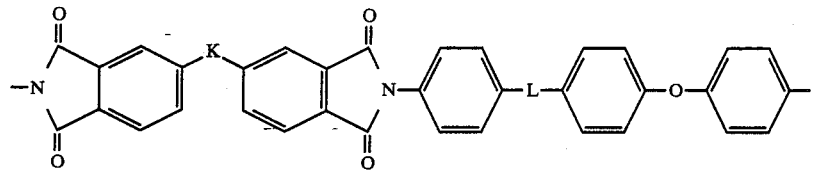
or
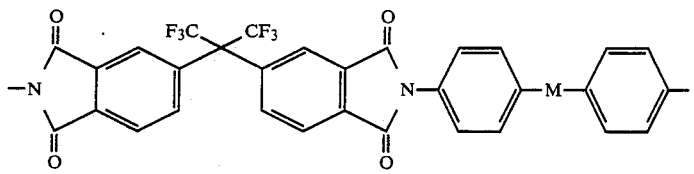
where K is carbonyl or a direct bond, L is isopropylidene or hexafluoroisopropylidene, and M is oxygen,
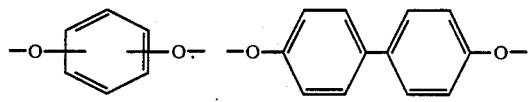
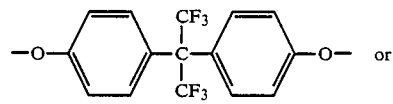 or
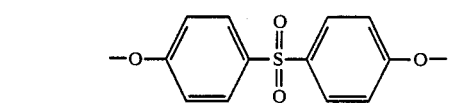
Further, it is preferred that the isopropylidene or hexafluoroisopropylidene containing poly(imide) be combined with a second component such as

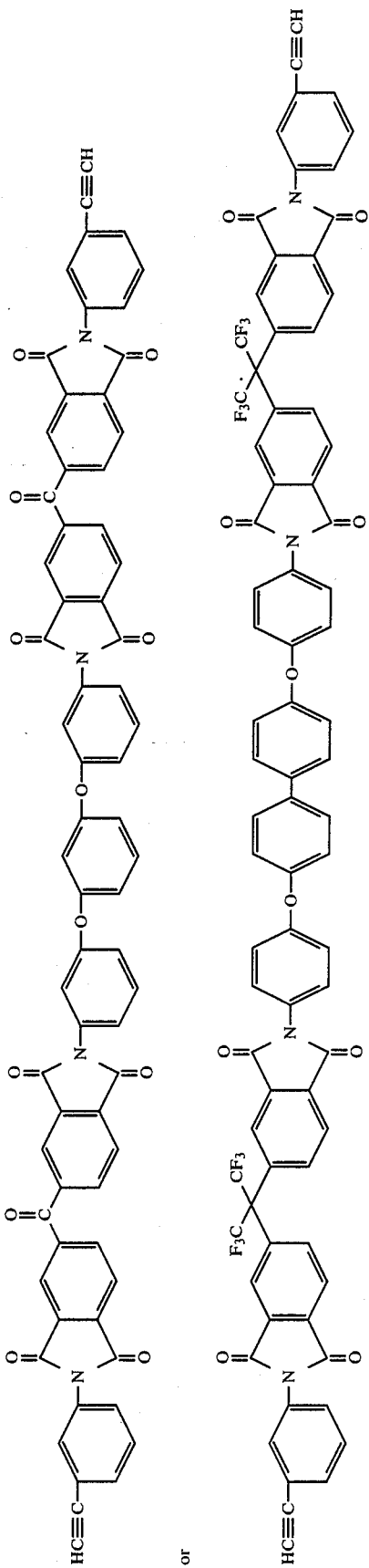
or

If second component is used in amounts of 20% or less, the electrical properties of the crosslinked composition are very similar to those of the uncrosslinked first component.

It is well known that most polymers are generally incompatible with each other. Most blends of two or more polymers contain the separate polymers as individual component domains or phases. Thus blends of what are termed compatible polymers generally are mechanically compatible only and exhibit properties which vary widely over the concentration range of the polymers. Such blends comprise a matrix polymer containing the other polymer as a dispersed or co-continuous phase. Such dispersed phases can be microscopic in size sometimes giving the resulting blend of multiple phases the appearance of being a single phase. There are, however, a few pairs of polymers which are molecularly compatible, that is, they form a molecularly dispersed mixture comprising a single amorphous phase when they are blended together. Not only do such blends not separate into their individual amorphous components, but they are also characterized by having a single glass transition temperature (Tg) and optical transparency. Mechanically compatible blends, on the other hand, exhibit two or more Tg's characteristic of the Tg's of the individual components. By the term glass transition temperature is meant the temperature at which an amorphous polymer or the amorphous regions of a partially crystalline polymer changes to or from a hard and relatively brittle state to a more flexible or rubbery condition. Measurement of glass transition temperatures of polymer systems is described, for example, in *Thermal Characterization Techniques*, Slade, et al., Marcel Dekker, Inc., New York (1970).

It has been surprisingly found that blends of the invention consisting of a acetylene terminated poly(imide) or poly(isoimide) and a poly(ether imide), as described above, are molecularly compatible.

The compositions of the invention can contain various additives, in order to give any desired property to the polymer composition. For example, stabilizers, flame retardants, pigments, plasticizers, surfactants and the like can be present. Compatible or non-compatible polymers may also be added to give a desired property.

The compositions of the invention are melt fusible. By melt fusible is meant that the material can be heated without significant decomposition above its glass transition temperature, if it is amorphous or above its crystalline melting point if it has crystallinity, and coalesced under pressure. See e.g. U.S. Pat. No. 4,485,140 to DuPont.

The compositions can be prepared by any convenient technique. For example, the components can be mixed on a two-roll mill, in an internal mixer such as a Brabender mixer or Banbury mixer, or in a twin-screw extruder. They may also be prepared by precipitation from a solvent, or cast from solution or the like.

The composition generally can be substantially cured preferably at elevated temperature i.e. 250°-350° C. for 30 min. to 3 hours. Where appropriate, the composition may also be cured by radiation or other means as appropriate to the reactive component selected.

A shaped article of the composition can be formed before or after cure by known techniques depending on the desired shape. Films or coatings of the composition can be formed by extrusion, spraying, spin coating or casting especially using solvents, and fibers formed fibers by melt spinning or the like. Other articles may be injection molded, compression molded, pour molded, blow molded or the like with or without additives as previously described.

The compositions of the invention are especially useful as improved adhesives and as coatings such as semiconductor coatings including alpha particle barriers, coatings for passivation and mechanical protection.

The compositions of this invention are particularly advantageous in the preparation of a layered article, in particular a multi-layered article for use in electronic systems. The article comprises a substrate, for example of glass or ceramic material, with at least one layer comprising a cured, aromatic polymer-based composition of this invention deposited on a surface thereof. Generally a plurality of layers are successively deposited on the substrate and cured. One or more layers of conductive material can be interposed between two adjacent layers of the aromatic polymer-based composition. The conductive layer is generally not continuous or coextensive with the adjacent polymeric layers and typically forms a plurality of electrically conductive pathways. The conductive layer is preferably of metal but can comprise a semi-conductive element.

In preparing such articles, the composition used is preferably highly resistant to hydrolysis and has a water absorption of less than about 2%, preferably less than about 1% when contacted with water at 90° C. for 960 minutes. The composition preferably also is a dielectric having a dielectric constant less than about 5, preferably less than about 3.

The article is prepared by coating the aromatic polymer in the form of a solution, preferably by a spin coating technique, onto the substrate. The solvent is evaporated and the composition is cured at elevated temperatures. Typically, the thickness of the coating is about 5 to 40 microns. The conductive layer is applied over the polymeric layer using, for example, a sputtering technique with appropriate areas masked to create the desired conductive pathways. The next polymeric layer is applied in the same manner as the first. These two steps can be repeated until the desired multi-layered article is produced. The multi-layered article can be used, for example, as a packaging-interconnect device for integrated circuits.

The invention also relates to a reinforced composition or matrix comprising the blend of the invention either cured or uncured and a reinforcing component e.g. carbon or glass fibers or other polymeric fibers or the like such as poly(amides) (e.g. poly(aramide) sold by DuPont under the trade name Kevlar) forming a high strength composite.

The following examples are representative of the invention but not intended to be limiting. Substitution of additives materials, polymers, and conditions which are obvious from this disclosure are within the contemplation of the invention.

DESCRIPTION OF THE PREFERRED EMBODIMENTS

In Example 1, Thermid resins MC-600, IP-600, IP-603, IP-615, and IP-630 obtained from National Starch in powder form were blended with Ultem 1000, (poly(ether imide)), Victrex PEEK (poly(aryl ether ketone) from ICI), Victrex PES(Poly(ether sulfone) from ICI), Udel (poly(sulfone) from Union Carbide), Lexan (poly(carbonate) from General Electric), and XU-218 (poly(imide) from Ciba-Geigy).

EXAMPLE 1 - PROCESSING

Sample A

To 100 ml of methylene chloride was added 18 grams of poly(ethersulfone) Victrex PES 200P (available from ICI, Ltd.) and 2 grams of Thermid IP-600. The solution was stirred until all the solids dissolved. The mixture was precipitated by adding 100 ml of isopropyl alcohol and stirring rapidly. The resulting powder was dried in air for 4 hours and at 125° C. for 4 hours. The dry powder was pressed at 315° C. at 1000 psi for 30 minutes to yield a transparent brown film.

Sample B

The procedure for Sample A was repeated but 16 grams of poly(ethersulfone) and 4 grams of Thermid IP-600 were used. The resulting yellow powder was pressed at 315° C. at 1000 psi for 30 minutes to yield a transparent brown film.

Sample C

The procedure for Sample A was repeated except 18 grams of poly(etherimide) (Ultem 1000 available from General Electric) and 2 grams of Thermid IP-600 were used. A light yellow powder resulted. The powder was pressed at 300° C. at 100 psi for 30 minutes to yield a transparent yellow film.

Sample D

The procedure for Sample A was repeated but 20 grams of Ultem 1000 poly(etherimide) and 10 grams of Thermid IP-603 were used. A yellow powder resulted.

Sample E

The procedure for Sample A was repeated but 18 grams of poly(carbonate) (Lexan 143 available from General Electric) were used. A light yellow powder resulted.

Sample F

The procedure Sample A was repeated except 16 grams of XU-218 poly(imide) (available from Ciba-Geigy) and 4 grams of Thermid IP-600 were used. The resulting dark yellow powder was pressed at 300° C. at 1000 psi for 30 minutes to yield a transparent brown film which was insoluble in methylene chloride.

Sample G

To 100 ml of 1-methyl-2-pyrrolidinone was added 16 grams of Ultem 1000 poly(etherimide) and 4 grams of Thermid IP-630. After the solids dissolved the solution was poured into a rapidly stirring solution of isopropyl alcohol to precipitate the solids. The solids were filtered, washed with ethanol, and dried. The resulting yellow powder was pressed at 300° C. at 100 psi for 30 minutes to yield a transparent yellow film. The blend had a single Tg of 189.3° C.

Sample H

The procedure for Sample G was repeated except 20 grams of Ultem 1000 poly(etherimide) and 10 grams of Thermid IP-615 were used. The resulting yellow powder was pressed at 300° C. at 100 psi for 30 minutes to yield a transparent yellow film. The blend had a single Tg of 191.2° C.

Sample I

The procedure for Sample G was repeated except 16 grams of poly(ethersulfone) (Victrex PES) and 4 grams of Thermid IP-630 were used. A yellow powder resulted.

Sample J

A mixture containing 90 weight percent poly(arylether ketone) power (Victrex PEEK 45G available from ICI) and 10 weight percent Thermid IP-630 powder were added to a Brabender mixer. The mix temperature was about 380° C. The resulting solid was pressed at 400° C. at 1000 psi for 5 minutes to yield a transparent material.

Sample K

The procedure for Sample J was repeated except a mixture containing 50 weight percent Victrex PEEK poly(aryletherketone) powder and 50 weight percent Thermid IP-630 were used. A transparent brown material was obtained.

Sample L

A mixture of 90 weight percent poly(aryletherketone) (Victrex PEEK 45G) powder and 10 weight percent of Thermid MC-600 powder was extruded on a Brabender twin screw extruder. The melt temperature was about 380° C. A brown extrudate was obtained and pelletized.

EXAMPLE 2 - BLEND MORPHOLOGY

Certain of the compositions were examined by scanning electron microscopy (SEM). Blends of Ultem 1000 poly(ether imide) with Thermid IP-600 and Thermid IP-630 at ratios of 80/20 and 65/35 and blends of poly(ether sulfone) with Thermid MC-600 at ratios of 80/20 and 67/33, respectively have been examined. No phase separation could be observed in any of the samples evaluated either before or after curing, which indicates continuous, sub-microscopic phase domains.

EXAMPLE 3 - MECHANICAL PROPERTIES

The mechanical properties of Ultem poly(etherimide) and a 90/10 blend of Ultem/Thermid IP-600 (tested at 200° C.) before and after aging at 200° C. are listed in Table 1. Before aging Ultem has a tensile strength of 4110 psi and 83% elongation versus 3238 psi and 58% elongation for the Ultem/Thermid IP-600 blend. After 7 days aging at 200° C. the Ultem/Thermid IP-600 blend has an almost 100% increase in tensile strength to 6418 psi with a drop in elongation to 10%. The Ultem shows a 10% increase in tensile strength to 4533 psi and a drop in elongation to 3% after 7 days aging at 200° C. Clearly the Ultem/Thermid IP-600 blend has much better performance at elevated temperatures than does pure Ultem.

EXAMPLE 4 - CURE CONDITIONS

Tables 2, 3, 4, and 5 list the gel levels for various cure conditions for Ultem/Thermid IP-600, Victrex PES/Thermid IP-600, Thermid IP-603 blends, and Thermid IP-630 blends, respectively. Gel levels were determined as percent insolubles in chloroform.

TABLE 1
THERMAL STABILITY OF ULTEM/THERMID IP-600 (90/10) RESIN* TESTED AT 200° C.

| MATERIAL | AGING TIME (DAYS) | TENSILE STRENGTH (PSI) | % ULTIMATE ELONGATION |
|---|---|---|---|
| ULTEM | 0 | 4,110 | 83 |
| ULTEM/IP-600 | 0 | 3,238 | 58 |
| ULTEM | 7 | 4,533 | 3 |
| ULTEM/IP-600 | 7 | 6,418 | 10 |
| ULTEM/IP-600 | 14 | 6,070 | 5 |

*ALL SAMPLES PRESSED AT 315° C. (600° F.) FOR 1 HOUR BEFORE AGING AT 200° C.

TABLE 2
PERCENT GEL FORMATION FOR ULTEM/THERMID IP600 BLENDS

| ULTEM/THERMIC IP-600 | CURE TEMP, °C. | CURE TIME (MIN) | % GEL |
|---|---|---|---|
| 95/5 | 287 | 900 | 60 |
| 95/5 | 315 | 900 | 40 |
| 90/10 | 260 | 30 | 20 |
| 90/10 | 260 | 60 | 38 |
| 90/10 | 260 | 120 | 47 |
| 90/10 | 287 | 10 | 30 |
| 90/10 | 287 | 30 | 45 |
| 90/10 | 287 | 45 | 48 |
| 90/10 | 287 | 60 | 52 |
| 90/10 | 315 | 30 | 52 |
| 90/10 | 315 | 120 | 62 |
| 80/20 | 315 | 900 | 100 |
| 80/20 | 350 | 20 | 61 |

TABLE 3
PERCENT GEL FORMATION FOR POLYETHERSULFONE/THERMID IP-600 BLENDS

| VICTREX PES/THERMID IP-600 | CURE TEMP (°C.) | CURE TIME (MIN) | % Gel |
|---|---|---|---|
| 90/10 | 315 | 30 | 21 |
| 80/20 | 315 | 10 | 70 |
| 80/20 | 315 | 30 | 78 |
| 80/20 | 315 | 900 | 100 |
| 80/20 | 343 | 60 | 66 |
| 80/20 | 350 | 20 | 41 |
| 80/20 | 350 | 120 | 100 |

TABLE 4
PERCENT GEL FORMATION FOR THERMID IP-603 BLENDS

| BLEND | RATIO | CURE CONDITION | PERCENT GEL |
|---|---|---|---|
| Ultem/IP-603 | 90/10 | 30 min. 287° C. | 38 |
| Ultem/IP-603 | 90/10 | 60 min. 287° C. | 42 |
| Ultem/IP-603 | 80/20 | 30 min. 287° C. | 56 |
| Ultem/IP-603 | 80/20 | 60 min. 287° C. | 61 |
| Ultem/IP-603 | 67/33 | 30 min. 287° C. | 81 |
| Victrex PES/IP-603 | 90/10 | 30 min. 315° C. | 21 |
| Victrex PES/IP-603 | 90/10 | 60 min. 315° C. | 10 |
| Victrex PES/IP-603 | 80/20 | 10 min. 315° C. | 70 |
| Victres PES/IP-603 | 80/20 | 30 min. 315° C. | 78 |
| Victrex PES/IP-603 | 80/20 | 60 min. 315° C. | 66 |

TABLE 5
PERCENT GEL FORMATION FOR THERMID IP-630 BLENDS

| BLEND | RATIO | CURE CONDITIONS | PERCENT GEL |
|---|---|---|---|
| Ultem/IP-630 | 80/20 | 30 min. 300° C. | 71 |
| Victrex PES/IP-630 | 80/20 | 30 min. 315° C. | 90.5 |
| Victrex PES/IP-630 | 67/33 | 30 min. 300° C. | 98 |

The most significant finding here is that addition of approximately 20% Thermid IP-600 or MC-600 to Ultem or Victrex PES leads to 100% gel formation. Fully cured blends (80/20 ratios) do not dissolve or swell significantly when exposed to methylene chloride (solvent for both Ultem and PES). Even the addition of only 10% Thermid IP-600 can lead to gel levels greater than 60%. Therefore, much improved solvent resistance is achieved.

EXAMPLE 5 - ADHESIVE PROPERTIES

Table 6 lists the lap shear strengths for stainless steel to stainless steel adhesive bonds using Thermid blends as hot melt thermosetting adhesives. At 200° C. the blends show much higher bond strengths than pure Ultem. Addition of 10% or 20% Thermid IP-600 to Ultem leads to a 25% increase in the lap shear strength at 200° C. The lap shear increase from 1240 psi to about 1540 psi. At 35% Thermid IP-600/65% Ultem the lap shear increases to 1697 psi (37% increase). Victrex PES/Thermid MC-600 blends can also be used as adhesive but they had much lower lap shear strengths than the Ultem/Thermid IP-600 blends at room temperature.

EXAMPLE 6 - COMPOSITE MATRIX APPLICATION

One of the applications of blends of the invention is as a matrix resin in fiber reinforced composites. The blends will offer improved thermal stability, creep resistance, solvent resistance, and high continuous use temperature.

Ultem/Thermid IP-600 and Victrex PES/Thermid IP-600 blends have been impregnated on both Kevlar poly(amide) fiber produced by duPont and carbon fibers.

A high modulus carbon fiber (Celion 6000 ANS available from Celanese Corporation) was impregnated with an Ultem 1000/Thermid IP-600 (95/5) blend in the following fashion: The continuous fiber was passed through a solution of 95 grams Ultem 1000 and 5 grams Thermid IP-600 in 380 grams chloroform at a rate of 10 feet per minute. Immediately after leaving the solution, the wet fiber was passed through a drying tower at 60° C. and a second drying tower at 120° C. The dry prepreg tow was passed between 2 hot rollers to smooth and flatten the tow. The prepreg (60% by volume carbon fiber) was woven into a 2 inch by 2 inch sample, consolidated at 290° C., 100 psi for 30 minutes and post cured at 280° C. for 24 hours in air. The consolidated sample showed an 8% weight loss and no delamination after 24 hour immersion in either chloroform or dichloromethane. A similarly prepared sample using Ultem 1000 as the matrix resin completely delaminated and the matrix resin dissolved when immersed 24 hours in chloroform or dichlormethane.

EXAMPLE 7 - ULTEM/THERMID ADHESIVE FILM PREPARATION

To 100 ml of dichloromethane was added 18 grams of Ultem 1000 and 2 grams of Thermid IP-600. The solution was stirred until the solids dissolved. The mixture was precipitated by adding 100 ml of isopropyl alcohol and stirring rapidly. The resulting powder was dried in air for 12 hours and at 125° C. for 4 hours. The dry powder was pressed at 275° C. at 1000 psi for 1 minute to yield an amber film.

The above procedure was repeated using 16 grams of Ultem 1000 and 4 grams of Thermid IP-600. An amber film was also obtained.

The above procedures were repeated using Thermid IP-603 in place of Thermid IP-600. Amber films were obtained.

TABLE 6
LAP SHEAR STRENGTHS FOR STAINLESS STEEL ADHESIVE BONDS (½" OVERLAP)

| MATERIAL | RATIO | LAP SHEAR (PSI) @ ROOM TEMP. | LAP SHEAR (PSI) @ 200° C. |
|---|---|---|---|
| Ultem | 100 | 1887 | 1240 |
| Ultem/Thermid IP-600 | 90/10 | — | 1547 |
| Ultem/Thermid IP-600 | 80/20 | 2880 | 1526 |
| Ultem/Thermid MC-600 | 65/35 | — | 1697 |
| Ultem/Thermid IP-603 | 90/10 | — | 1723* |
| Ultem/Thermid IP-603 | 80/20 | 2340 | 1698* |
| Victrex PES/Thermid MC-600 | 80/20 | 1905 | — |
| Victrex PES/Thermid MC-600 | 67/33 | 1630 | — |
| Ultem/Thermid IP-615 | 80/20 | 2375 | — |
| Ultem/Thermid IP-630 | 80/20 | 2829 | — |
| Ultem/Thermid IP-630 | 80/20 | 1821 | — |

Cure Conditions: 25 minutes, 315° C., 100 psi

*Ultem/Thermid IP-603 adhesives cured at 275° C., 20 minutes, at 100 psi pressure. The adhesive films were prepared in the same manner described in Example 1 but Thermid IP-603 was substituted for Thermid IP-600. All samples had a single Tg.

EXAMPLE 8 - CERAMIC COATING

Sample A

To 100 ml of dry 1-methy-2-pyrrolidinone was added 15 grams of XU-218 and 5 grams of Thermid IP-600. The solution was stirred until the solids dissolved. The solution was poured on to a 4 inch×4 inch ceramic substrate which was spinning at 2000 rpm. After 30 seconds the ceramic was stopped and placed in an oven at 80° C. for 1 hour, 125° C. for 1 hour, 200° C. for 30 min. and 250° C. for 30 minutes. A light yellow coating resulted. The bond strength of the coating to the ceramic at room temperature was 1673 psi.

Sample B

The above experiment was repeated but 16 grams of Ultem and 4 grams of Thermid IP-600 were used. A light yellow coating resulted. Bond strength of the coating to ceramic was greater than 9700 psi.

Sample C - Crosslinked Polyimide

To a solution of 85.0 g (0.207 moles) 2,2-bis[4-(4-aminophenoxy)phenyl] propane and 120.0 g Thermid LR-600 in 300 g 2-methoxyethyl ether was added dropwise a solution of 66.75 g (0.207) moles 3,3',4,4'-benzophenone tetracarboxylic dianhydride (BTDA) in 260 g 1-methyl-2-pyrrolidinone. External cooling was used to keep the reaction temperature below 20° C. After addition of the BTDA solution was complete, the mixture was stirred an additional 3 hours. A 5 ml sample of the solution was spin coated on to a 4 inch by 4 inch ceramic substrate (1000 rpm for 15 seconds) and dried and cured under the following conditions: 15 minutes at 90° C., 25 minutes at 150° C., 15 minutes at 200° C., 30 minutes at 350° C., and 30 minutes at 200° C. A second 5 ml of solution was applied, dried and cured as described above. No cracks in the first or second layers of cured polyimide could be detected when the sample was examined with an optical microscope (50X).

Sample D - Uncrosslinked Polyimide

To a solution of 0.85 g (0.00207 moles) 2,2-bis[4-(4-aminophenoxy)-phenyl] propane mixture of 2.5 g 2-methoxyethyl ether and 0.5 g 1-methyl-2-pyrrolidinone (NMP) was added a solution of 0.667 g (0.00207 moles) BTDA in 2.6 g NMP. The solution was stirred for an additional 3 hours. A 2.5 ml sample was spin coated on to a 4 inch by 4 inch ceramic substrate (1000 rpm for 15 seconds) and dried and cured as described above. A second 2.5 ml of solution was applied, dried and cured as described above. The cured polyimide was examined with an optical microscope (50X) and sever cracking in the first layer of polyimide was observed.

Sample E - Polyimide Blend

A polyamic acid solution was prepared as follows: To a solution of 2.26 g (0.00777 moles) 1,3-bis(3-aminophenoxy)benzene in 20 g NMP was added 2.5 g (0.00776 moles) BTDA. The solution was stirred for 3 hours. A brown, viscous solution resulted. Identified as PAA-A.

A second polyamic acid solution was prepared as follows: To a solution of 8.5 g (0.0207 moles) 2,2-bis(4-(4-aminophenoxy)-phenyl) propane in 30 g NMP was added dropwise with stirring a solution of 6.667 g (0.0207 moles) BTDA in 26 g NMP. The solution was stirred for an additional 2 hours. A brown, viscous solution resulted. Identified as PAA-B.

To a solution of 10 g PAA-A was added 27.1 g PAA-B. The mixture was stirred for 30 minutes. A brown, viscous, homogeneous solution resulted. Ratio of PAA-A to PAA-B is 1:3 (weight ratio of solids). A 3.5 ml sample of the polyamic acid mixture was spin coated on to a ceramic substrate (1500 rpm for 15 seconds), dried and cured (30 minutes at 100° C., 30 minutes at 200° C., and 30 minutes at 325° C.). A second 3.5 ml sample of polyamic acid solution was applied, dried and cured as described above. The cured polyimide blend was examined with an optical microscope (50X). Severe cracking of the first layer was observed.

Sample F - Copolyimide

To a solution of 2.0 g (0.00488 moles) 2,2-bis(4-(4-aminophenoxy)-phenyl propane and 0.5 g (0.00171 moles) 1,3-bis(4-aminophenoxy) benzene in 25 g NMP was added 2.12 g (0.00659 moles) BTDA in four portions with stirring over a 15 minute period. The mixture was stirred for an additional 2 hours. A 5 ml sample of the polyamic acid solution was spin coated (1500 rpm for 15 seconds) on to a ceramic substrate, dried and cured (30 minutes at 100° C., 30 mintues at 200° C., and 30 mintues at 325° C.). A second coating of the polyamic acid solution was applied, dried and cured as above. The cured polyimide copolymer was examined with an optical microscope (50X). Severe cracking of the first layer was observed.

The following three examples disclose a method for making other reactive second components where the reactive end group is a maleimide or vinyl group.

EXAMPLE 9

To a solution of 5.0 g (0.0122 moles) 2,2-bis[4-(4-amino-phenoxy)-phenyl] propane in 75 ml of dry 1-methyl-2-pyrrolidinone was added 2.0 g (0.0062 moles) of BTDA and 1.2 g (0.0122 moles) maleic anhydride. After stirring under nitrogen for 45 minutes at room temperature, 4.1 g 4,4'-bis(4-aminophenoxy)biphenyl followed by 4.9 g (0.0.11 moles) 2,2-bis(3,4-dicarboxyphenyl) hexafluoropropane dianhydride was added. After 25 minutes, the mixture was coated on to a ceramic substrate, dried and cured (10 minutes at 100° C., 10 minutes at 200° C., and 20 minutes at 325° C.). A light brown, pin hole free coating resulted.

EXAMPLE 10

To a solution of 1.5 g (0.0075 moles) 4,4'-diaminodiphenyl ether and 1.4 g (0.015 moles) 3-aminostyrene in 15 ml of dry 1-methyl-2-pyrrolidinone is added 4.8 g (0.015 moles) of BTDA. After stirring 24 hours at room temperature, 10 ml acetic anhydride and 3 ml pyridine is added to imidize the vinyl terminated amic acid oligomer. Coagulation in methanol affords 7.1 g vinyl terminated polyimide oligomer (VTPO).

To a solution of 3.0 g Victrex PES (polyethersulphone) in a mixture of 14 g N,N-dimethylformamide and 1 g m-xylene is added 1.0 g VTPO. The solution is coated on to a metal substrate, dried and cured (10 minutes at 100° C., 10 minutes 15 200° C., and 20 minutes at 325° C.).

EXAMPLE 11

To a solution of 1.5 g (0.0036 moles) 2,2-bis[4-(4-aminophenoxy)-phenyl] propane in 15 ml dry 1-methyl-2-pyrrolidinone is added 0.59 g (0.0018 moles) BTDA and 0.36 g (0.0036 moles) maleic anhydride. After stirring 24 hours at room temperature, 10 ml acetic anhydride and 3.0 ml pyridine is added to imidize the amic acid oligomer. Coagulation in methanol affords 2.3 g maleimide terminated polyimide oligomer (MTPO).

To a solution of 4.0 g Ultem 1000 in 17 g 1-methyl-2-pyrrolidinone is added 1.0 g MTPO. The solution is coagulated using a non-solvent, such as isopropyl alcohol, and dried to yield a granular powder. The dry powder is pressed at 250° C. at 1000 psi for 1 minute to yield an amber film.

I claim:

1. An article comprising a substrate having on a surface thereof at least one layer of a curable composition comprising:
   (a) a first component comprising an aromatic polymer having a first preponderant repeat unit selected from the group consisting of
   (i) poly(sulfone)
   (ii) poly(aryl ether ketone)
   (iii) poly(carbonate)
   (iv) poly(arylate)
   (v) poly(imide)
   (vi) poly(benzimidozopyrolone), and
   (v) poly(imide isoindoquinazolinedione), said aromatic polymer being substantially free of acetylene, maleimide, or vinyl terminal groups, and
   (b) a second component comprising an acetylene, maleimide, or vinyl terminated poly(imide) or poly(isoimide) or precursor thereof, which second component is compatible with the first component, has 1 to 300 second preponderant repeat units which are different from the first preponderant repeat units, is substantially free of elemental sulfur and reactive divalent sulfur, and is present in an amount effective to substantially cure the composition to a gel content of at least about 10%, as measured by percent insolubles in chloroform.

2. An article according to claim 1, wherein said substrate has on said surface thereof a plurality of said layers.

3. An article according to claim 2, wherein there is a layer of conductive material interposed between two adjacent layers.

4. An acticle according to claim 3, wherein the layer of conductive material is non-continuous and forms a plurality of conductive paths across the article.

5. An article according to claim 4, further comprising at least one semi-conductor element.

6. An article according to claim 1, wherein said curable composition is cured.

7. An article according to claim 1 or 6, wherein said second component is of the formula:

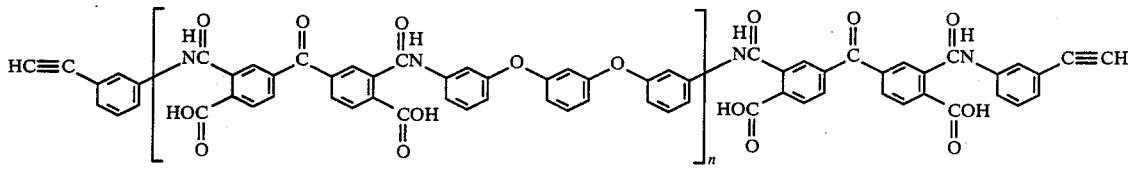

wherein n is 1 to about 300.

8. An article according to claim 7, wherein n is 1 to about 30.

9. An article according to claim 1 or 6, wherein said second component comprises from about 5% to about 35% of said curable composition.

10. An article according to claim 1 or 6, wherein said first component is a poly(sulfone) having the repeat unit

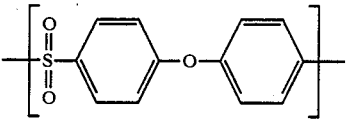

as its preponderant repeat unit.

11. An article according to claim 1 or 6, wherein said first component is a poly(sulfone) having the repeat unit

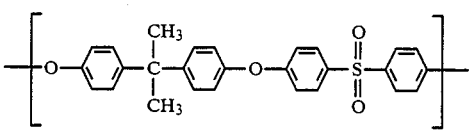

as its preponderant repeat unit.

12. An article according to claim 1 or 6, wherein said first component is a poly(aryl ether ketone) having a first preponderant repeat unit selected from the group consisting of

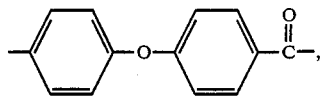

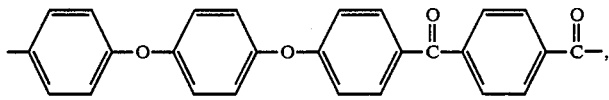

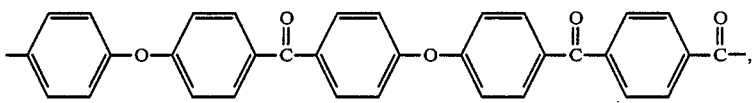

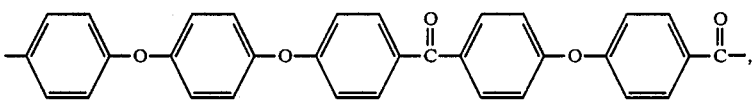

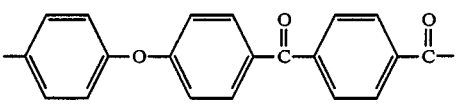

and

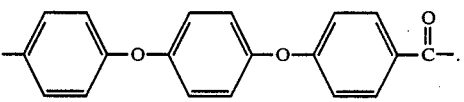

13. An article according to claim 1 or 6, wherein said first component is a poly(carbonate) having the repeat unit

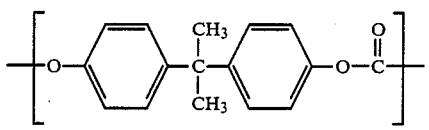

as its preponderant repeat unit.

14. An article according to claim 1 or 6, wherein said first component is a poly(arylate) having the repeat unit

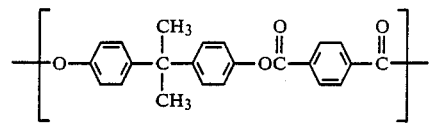

as its preponderant repeat unit.

15. An article according to claim 1 or 6, wherein said first component is a poly(imide) having the repeat unit

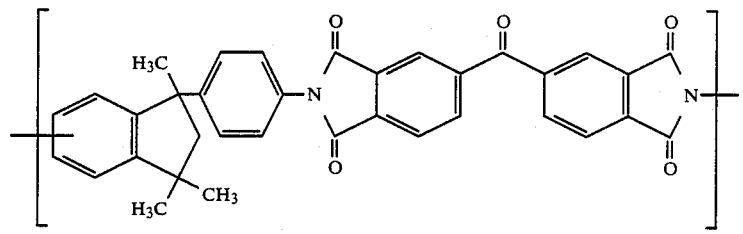

as its preponderant repeat unit.

16. An article according to claim 1 or 6, wherein said first component is a poly(etherimide) having the repeat unit

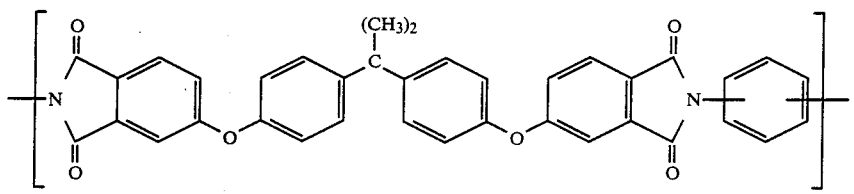

as its preponderant repeat unit.

17. An article according to claim 1 or 6, wherein said first preponderant repeat unit of said first component has isopropylidene or hexafluoroisopropylidene groups in its backbone.

18. An article according to claim 1 or 6, wherein said first preponderant repeat unit of said first component is

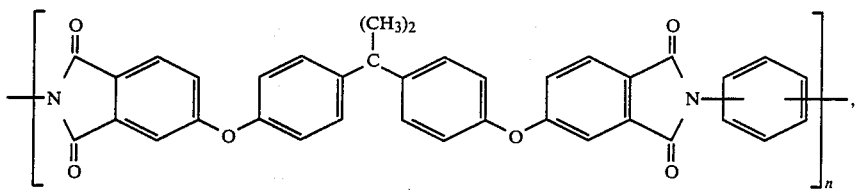

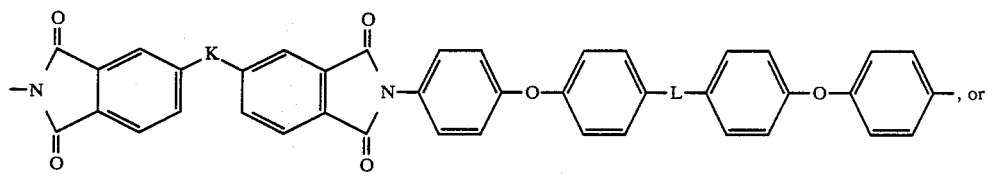

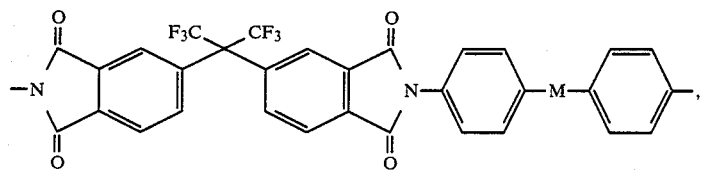

where K is carbonyl or a direct bond, L is isopropylidene or hexafluoroisopropylidene, and M is oxygen,

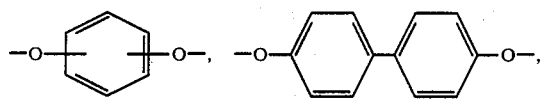

-continued

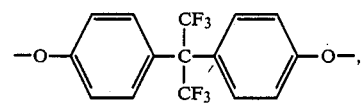

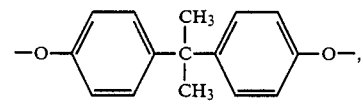

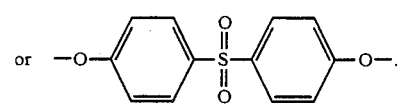

19. An article according to claim 1 or 6, wherein the second component has a second preponderant repeat unit selected from the group consisting of

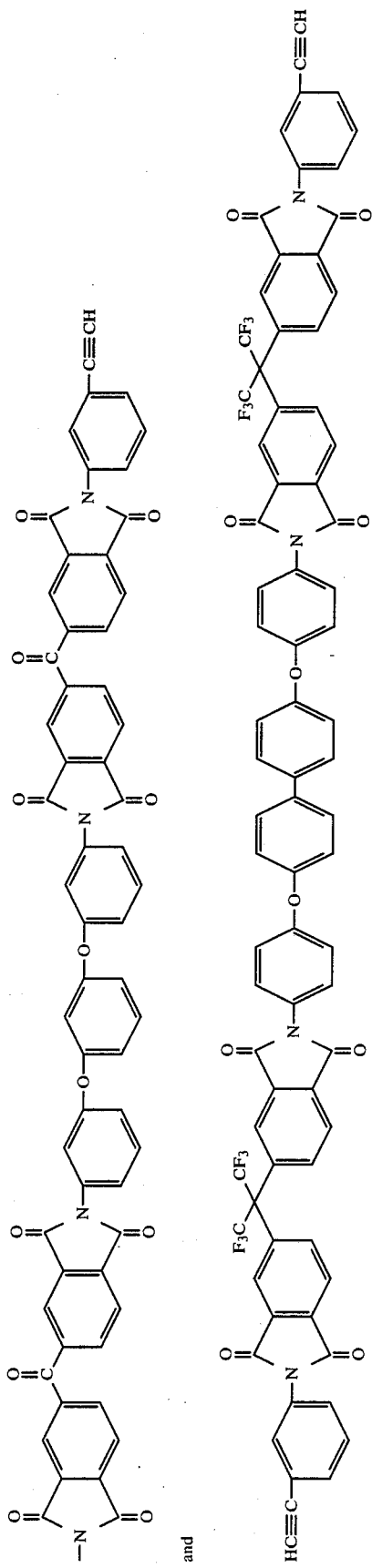

20. An article according to claim 1 or 6, wherein said curable composition has a moisture absorption less than about 2%.

21. An article according to claim 1 or 6, wherein said curable composition has a dielectric constant less than about 5.

22. An article according to claim 1 or 6, wherein said second component is a monomeric mixture of compounds of the formula

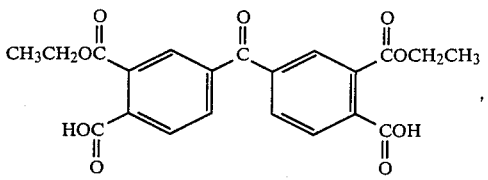

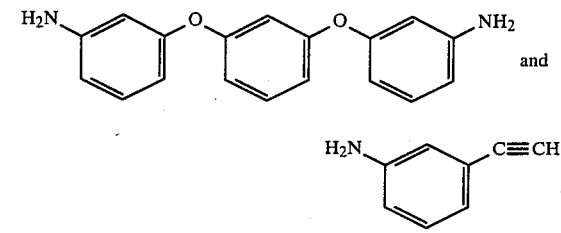

in the respective molar ratio of n:(n−1):2 wherein n is 2 to 300.

23. An article according to claim 1 or 6, wherein said second component is of the formula

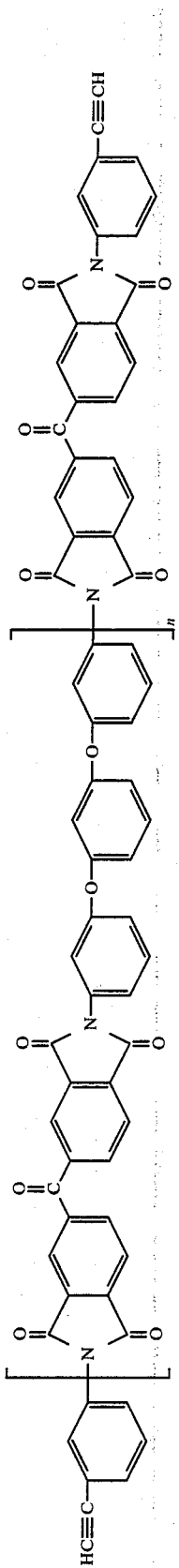

wherein n is 1 to 300.
24. An article according to claim 23, wherein n is 1 to about 30.
25. An article according to claim 1 or 6, wherein said second component is of the formula:
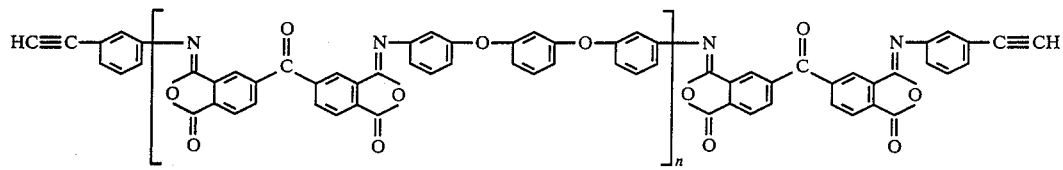
wherein n is 1 to 300.
26. An article according to claim 25, wherein n is 1 to about 30.
* * * * *